United States Patent
Ye

(10) Patent No.: US 10,237,863 B2
(45) Date of Patent: Mar. 19, 2019

(54) DEVICE AND METHOD OF HANDLING A HYBRID AUTOMATIC REPEAT REQUEST PROCESS IN A LICENSED ASSISTED ACCESS SECONDARY CELL

(71) Applicant: HTC Corporation, Taoyuan (TW)

(72) Inventor: Shiang-Rung Ye, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/448,561

(22) Filed: Mar. 2, 2017

(65) Prior Publication Data
US 2017/0257851 A1 Sep. 7, 2017

Related U.S. Application Data

(60) Provisional application No. 62/303,382, filed on Mar. 4, 2016.

(51) Int. Cl.
| | |
|---|---|
| *H04L 1/18* | (2006.01) |
| *H04L 5/00* | (2006.01) |
| *H04W 24/08* | (2009.01) |
| *H04W 72/04* | (2009.01) |
| *H04W 72/12* | (2009.01) |
| *H04W 72/14* | (2009.01) |
| *H04W 76/28* | (2018.01) |

(52) U.S. Cl.
CPC ......... *H04W 72/042* (2013.01); *H04L 1/1861* (2013.01); *H04L 1/1883* (2013.01); *H04L 1/1896* (2013.01); *H04L 5/0055* (2013.01); *H04W 24/08* (2013.01); *H04W 72/0446* (2013.01); *H04W 72/1268* (2013.01); *H04W 72/14* (2013.01); *H04W 76/28* (2018.02)

(58) Field of Classification Search
CPC ........................... H04W 76/048; H04W 24/10
USPC .................................................. 370/252, 328
See application file for complete search history.

(56) References Cited

U.S. PATENT DOCUMENTS 8,489,950 B2 * 7/2013 Huang ................. H04L 1/1829
714/746
9,078,148 B2 * 7/2015 Lee ................... H04W 52/0216
(Continued)

OTHER PUBLICATIONS

Search Report dated Jul. 7, 2017 for EP application No. 17158865.0, pp. 1-17.

(Continued)

*Primary Examiner* — Melanie Jagannathan
(74) *Attorney, Agent, or Firm* — Winston Hsu

(57) ABSTRACT

A communication device for handling a HARQ process in a LAA SCell comprises a storage unit and a processing circuit configured to execute instructions stored in the storage unit. The instructions comprise receiving at least one UL grant from a network in a DL subframe, wherein a UL grant of the at least one UL grant schedules at least one PUSCH transmission associated with a UL HARQ process in at least one UL subframe, and a first timer and a second timer are associated with the UL HARQ process; starting the first timer in a first UL subframe of the at least one UL subframe, if the communication device is not able to perform a PUSCH transmission of the at least one PUSCH transmission in the first UL subframe; starting the second timer, when the first timer expires; and monitoring a PDCCH, when the second timer is running.

15 Claims, 5 Drawing Sheets

(56) References Cited

U.S. PATENT DOCUMENTS

| | | | | |
|---|---|---|---|---|
| 2013/0258977 A1* | 10/2013 | Kim | ............... | H04L 5/0053 |
| | | | | 370/329 |
| 2015/0189690 A1* | 7/2015 | Lee | ............... | H04W 76/00 |
| | | | | 370/328 |
| 2015/0359034 A1* | 12/2015 | Kim | ............... | H04W 76/28 |
| | | | | 370/328 |

OTHER PUBLICATIONS

Motorola Mobility, "Further Discussions on Physical Layer options for LAA-LTE", 3GPP TSG RAN WG1#81, R1-153183, Apr. 25-May 29, 2015, Fukuoka, Japan, XP050973404, pp. 1-7.
InterDigital Communications, "Update to DRX Behaviour in support of Asynchronous UL HARQ", 3GPP TSG-RAN WG2 #91bis, Tdoc R2-154650(update to R2-153780), Oct. 5-9, 2015, Malmö, Sweden, XP051005164, pp. 1-2.
ETSI TS 136 321 v13.0.0 (Feb. 2016).
3GPP TSG RAN WG2 89bis R2-151001, Apr. 2015.
Draft Report of 3GPP TSG RAN WG2 meeting #93, Feb. 2016.
Search Report dated Oct. 17, 2017 for EP application No. 17158865.0, pp. 1-12.

* cited by examiner

DEVICE AND METHOD OF HANDLING A HYBRID AUTOMATIC REPEAT REQUEST PROCESS IN A LICENSED ASSISTED ACCESS SECONDARY CELL

CROSS REFERENCE TO RELATED APPLICATIONS

This application claims the benefit of U.S. Provisional Application No. 62/303,382, filed on Mar. 4, 2016, which is incorporated herein by reference.

BACKGROUND OF THE INVENTION

1. Field of the Invention

The present invention relates to a communication device and a method used in a wireless communication system, and more particularly, to a communication device and a method of handling a hybrid automatic repeat request process in a licensed assisted access secondary cell.

2. Description of the Prior Art

A long-term evolution (LTE) system provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3rd Generation Partnership Project (3GPP) Rel-10 standard or later versions.

The eNB may communicate with the UE in an unlicensed band via the LAA using LTE technique. The eNB may schedule the UE to transmit data in a subframe in the unlicensed band. However, the UE may not complete the transmission of the data to the eNB in the subframe due to a status (e.g., channel is busy) of the unlicensed band. According to the prior art, it is unknown whether the UE continues to monitor the unlicensed band, if the UE does not complete the transmission of the data.

Thus, how to handle a communication operation between the eNB and the UE in the unlicensed band is a problem to be solved.

SUMMARY OF THE INVENTION

The present invention therefore provides a communication device and a method for handling a hybrid automatic repeat request (HARQ) process in a licensed assisted access (LAA) secondary cell (SCell) to solve the abovementioned problem.

A communication device for handling a HARQ process in a LAA SCell comprises a storage unit for storing instructions and a processing circuit coupled to the storage unit. The processing circuit is configured to execute the instructions stored in the storage unit. The instructions comprise receiving at least one uplink (UL) grant from a network in a downlink (DL) subframe, wherein a UL grant of the at least one UL grant schedules at least one physical UL shared channel (PUSCH) transmission associated with a UL HARQ process in at least one UL subframe, and a first timer and a second timer are associated with the UL HARQ process; starting the first timer in a first UL subframe of the at least one UL subframe, if the communication device is not able to perform a PUSCH transmission of the at least one PUSCH transmission in the first UL subframe; starting the second timer, when the first timer expires; and monitoring a physical DL control channel (PDCCH), when the second timer is running.

A communication device for handling a HARQ process in a LAA SCell comprises a storage unit for storing instructions and a processing circuit coupled to the storage unit. The processing circuit is configured to execute the instructions stored in the storage unit. The instructions comprise receiving a plurality of UL grants from a network in a DL subframe, wherein the plurality of UL grants schedule a plurality of PUSCH transmissions associated with a UL HARQ process to the communication device; performing a first PUSCH transmission of the plurality of PUSCH transmissions scheduled by the network in a first UL subframe, according to a first time offset comprised in a first UL grant of the plurality of UL grants; and performing a second PUSCH transmission of the plurality of PUSCH transmissions scheduled by the network in a second UL subframe, according to a second time offset comprised in a second UL grant of the plurality of UL grants, after performing the first PUSCH transmission.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
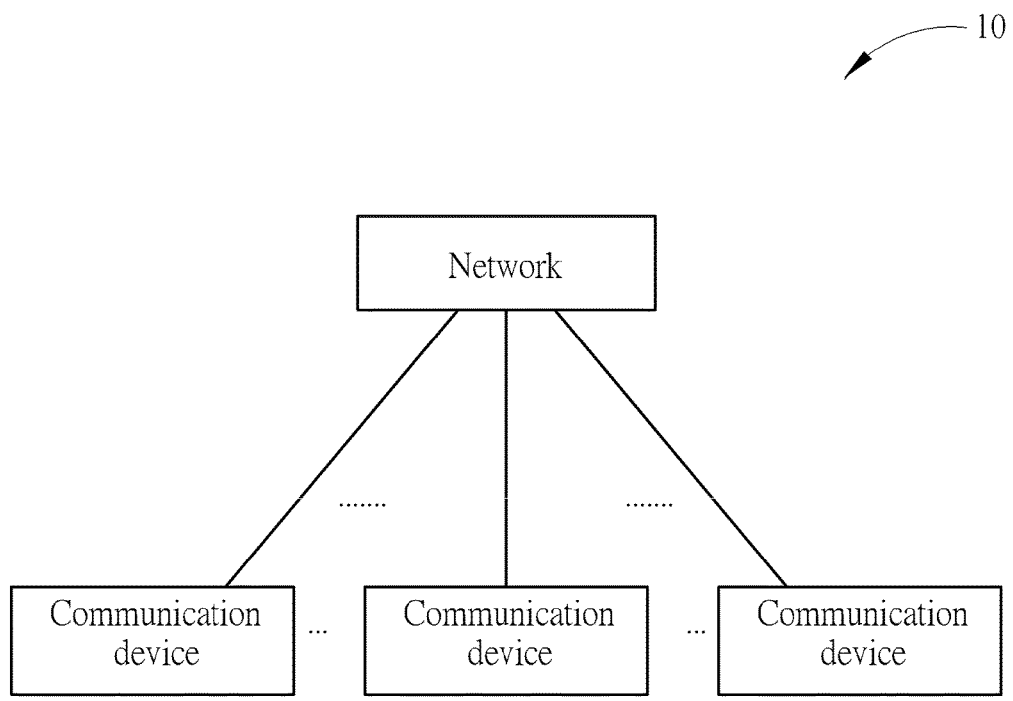
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a universal terrestrial radio access network (UTRAN) comprising at least one Node-B (NB) and/or a Radio Network Controller (RNC) in a universal mobile telecommunications system (UMTS). In one example, the network may be an evolved UTRAN (E-UTRAN) comprising at least one evolved NB (eNB) and/or at least one relay in a long term evolution (LTE) system, a LTE-Advanced (LTE-A) system or an evolution of the LTE-A system. In one example, the network may be a fifth generation (5G) network including at least one 5G base station (BS) which employs orthogonal frequency-division multiplexing (OFDM) and/or non-OFDM, and transmission time interval smaller than 1 millisecond (ms) for communication with the communication devices. In general, a BS may also be used to refer any of the NB, the RNC, the eNB and the 5G BS.

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device can be a user equipment (UE), a low cost device (e.g., machine type communication (MTC) device), a mobile phone, a laptop, a tablet computer, an electronic book, a portable computer system, a vehicle or aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
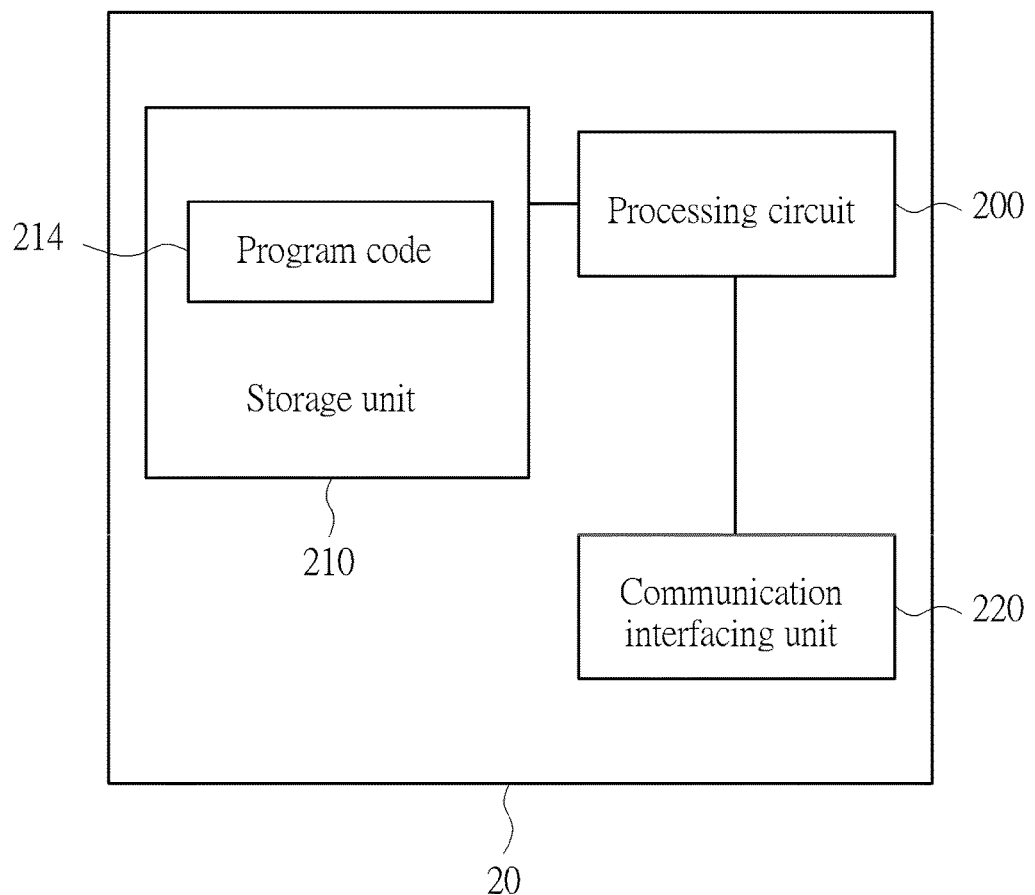
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing circuit 200.

In the following embodiments, a UE is used to represent a communication device in FIG. 1, to simplify the illustration of the embodiments.

Figure 3:
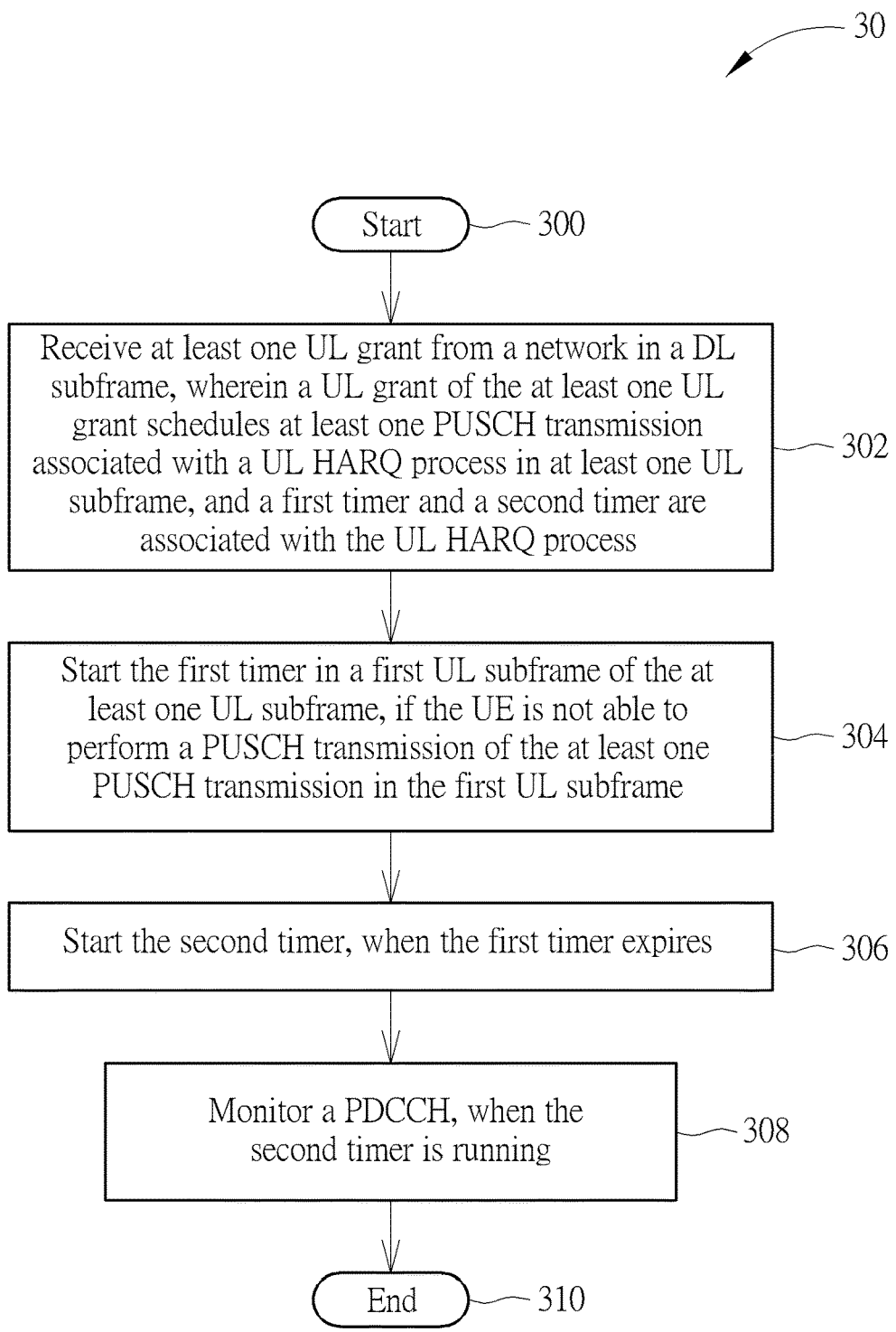
FIG. 3 is a flowchart of a process according to an example of the present invention.

FIG. 3 is a flowchart of a process 30 according to an example of the present invention. The process 30 may be utilized in a UE for handling a hybrid automatic repeat request (HARQ) process in a licensed assisted access (LAA) secondary cell (SCell). The process 30 may be compiled into the program code 214, and includes the following steps:

Step 300: Start.

Step 302: Receive at least one UL grant from a network in a DL subframe, wherein a UL grant of the at least one UL grant schedules at least one physical UL shared channel (PUSCH) transmission associated with a UL HARQ process in at least one UL subframe, and a first timer and a second timer are associated with the UL HARQ process.

Step 304: Start the first timer in a first UL subframe of the at least one UL subframe, if the UE is not able to perform a PUSCH transmission of the at least one PUSCH transmission in the first UL subframe.

Step 306: Start the second timer, when the first timer expires.

Step 308: Monitor a physical DL control channel (PDCCH), when the second timer is running.

Step 310: End.

According to the process 30, the UE may receive at least one UL grant from a network in a DL subframe, wherein a UL grant of the at least one UL grant schedules at least one PUSCH transmission associated with a UL HARQ process in at least one UL subframe, and a first timer and a second timer are associated with the UL HARQ process. Then, the UE may start (or restart) the first timer in a first UL subframe of the at least one UL subframe, if the UE is not able to perform a PUSCH transmission of the at least one PUSCH transmission in the first UL subframe. In one example, the UE may not able to perform the PUSCH transmission, if a channel (e.g., frequency or band) is determined to be occupied (e.g., busy) according to a listen before talk (LBT) result of the channel, or if the UE is within a backoff period. The UE may start (or restart) the second timer, when the first timer expires. The UE may monitor a PDCCH even that the UE is not in an on duration of a discontinuous reception (DRX) cycle, when the second timer is running. That is, the UE may receive (or monitor) the PDCCH (or enhanced PDCCH (ePDCCH)) efficiently by utilizing (e.g., starting or restarting) the first timer and the second timer. Power consumption and specification complexity of the UE can be reduced. Thus, the problem in the prior art is solved according to the process 30.

Realization of the process 30 is not limited to the above description. The following examples may be applied to the process 30.

In one example, the UE may start the first timer at a start of the first UL subframe. In one example, the UE may start the first timer in the DL subframe. In one example, the UE may stop the second timer if the second timer is running, when the UE starts the first timer. In one example, a frequency resource may be for receiving the at least one UL grant and for performing the PUSCH transmission. That is, the at least one UL grant may be received at the frequency resource, and the PUSCH transmission may be performed at the same frequency resource. Further, the frequency resource may be configured by the network via a radio resource control (RRC) message.

In one example, the first timer may be a UL round trip time (RTT) timer, and the second timer may be a UL retransmission timer. In one example, the UE may start the first timer at an end of the first UL subframe. In one example, the UE may start the first timer in a second UL subframe of the at least one UL subframe, and the PUSCH transmission may be scheduled to be transmitted in the second UL subframe. In one example, the UE may start the first timer at an end of a third UL subframe of the at least one UL subframe, and the PUSCH transmission may be scheduled to be transmitted in the third UL subframe. In one example, a value of the first timer may be set to less than a time interval within which a retransmission of the UL HARQ process is expected to be received by a media access control (MAC) entity. In one example, an order of a plurality of PUSCH transmissions including the at least one PHUCH transmission may be corresponded to an order of the least one UL grant. In one example, a time distance between two consecutive PUSCH transmissions of the plurality of PUSCH transmissions may be fixed, or may be configured by the network via a RRC message.

Figure 4:
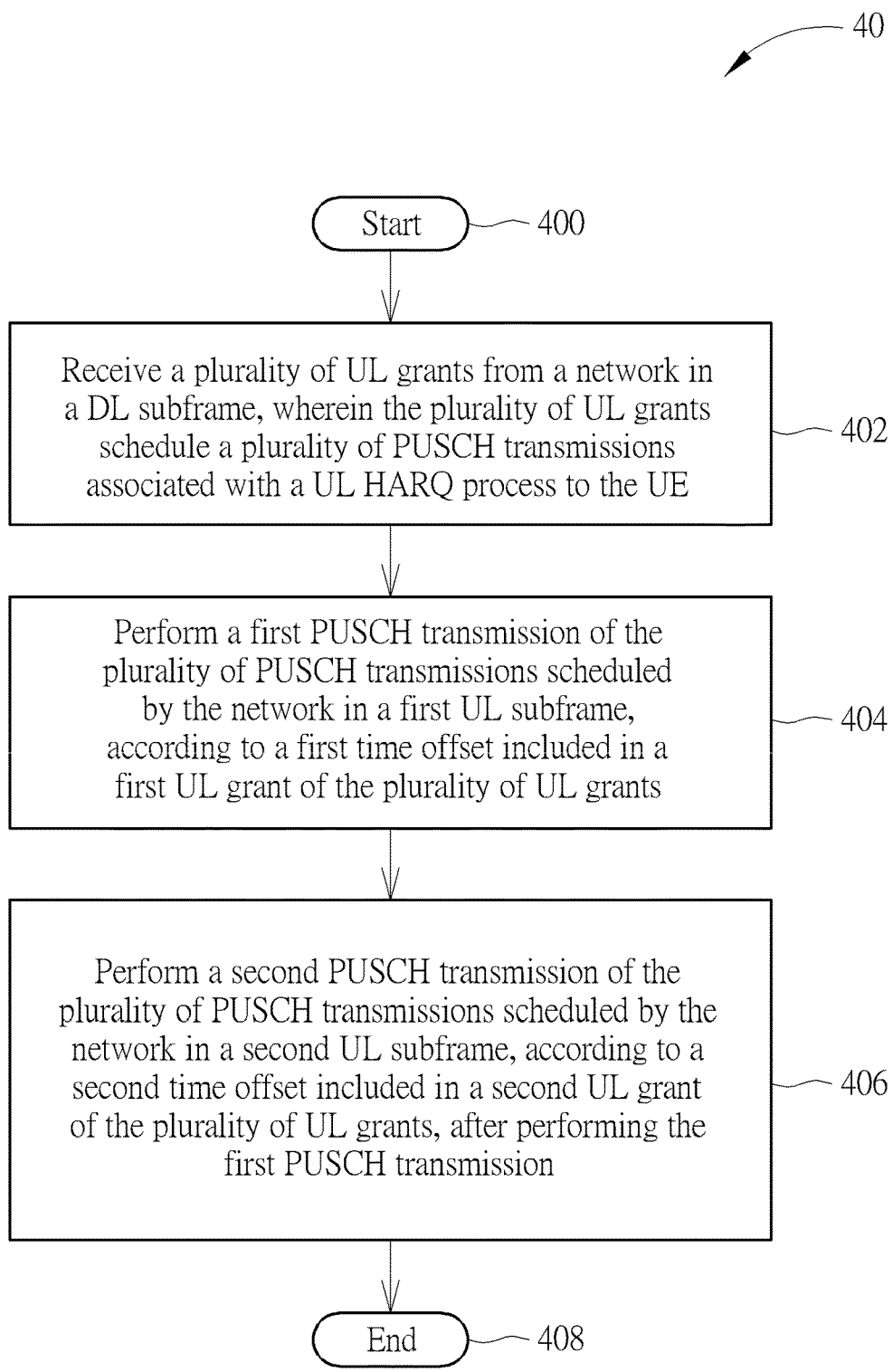
FIG. 4 is a flowchart of a process according to an example of the present invention.

FIG. 4 is a flowchart of a process 40 according to an example of the present invention. The process 40 may be utilized in a UE for handling a HARQ process in a LAA SCell. The process 40 may be compiled into the program code 214, and includes the following steps:

Step 400: Start.

Step 402: Receive a plurality of UL grants from a network in a DL subframe, wherein the plurality of UL grants schedule a plurality of PUSCH transmissions associated with a UL HARQ process to the UE.

Step 404: Perform a first PUSCH transmission of the plurality of PUSCH transmissions scheduled by the network in a first UL subframe, according to a first time offset included in a first UL grant of the plurality of UL grants.

Step 406: Perform a second PUSCH transmission of the plurality of PUSCH transmissions scheduled by the network in a second UL subframe, according to a second time offset included in a second UL grant of the plurality of UL grants, after performing the first PUSCH transmission.

Step 408: End.

According to the process 40, the UE may receive a plurality of UL grants from a network in a DL subframe, wherein the plurality of UL grants schedule a plurality of PUSCH transmissions associated with a UL HARQ process to the UE. Then, the UE may perform a first PUSCH transmission of the plurality of PUSCH transmissions scheduled by the network in a first UL subframe, according to a first time offset included in a first UL grant of the plurality of UL grants. The UE may perform a second PUSCH transmission of the plurality of PUSCH transmissions scheduled by the network in a second UL subframe, according to a second time offset included in a second UL grant of the plurality of UL grants, after performing the first PUSCH transmission. That is, the first PUSCH transmission and the second PUSCH transmission may be performed according to the first time offset and the second time offset, respectively. Power consumption and specification complexity of the UE can be reduced. Thus, the problem in the prior art is solved according to the process 40.

Realization of the process 40 is not limited to the above description. The following examples may be applied to the process 40.

In one example, the first time offset may indicate a first time distance between the DL subframe and the first UL subframe. In one example, the second time offset may indicate a second time distance between the first UL subframe and the second UL subframe. For example, the first time offset may be set to 5 subframes, and the second time offset may be set to 8 subframes, but are not limited herein. The first UL subframe is subframe 6, if the DL subframe is subframe 1. The second UL subframe is subframe 14, if the first UL subframe is subframe 8. In one example, a time distance between two consecutive PUSCH transmissions of the plurality of PUSCH transmissions may be fixed, or may be configured by the network via a RRC message. For example, the time distance may be 4 subframes, but is not limited herein.

In one example, the UE may perform a new transmission for the second PUSCH transmission, when receiving a HARQ acknowledgement (ACK) for the first PUSCH transmission from the network. In one example, the communication device performs a retransmission for the second PUSCH transmission, when receiving a HARQ negative ACK (NACK) or a discontinuous transmission (DTX) for the first PUSCH transmission from the network. In one example, the communication device performs a new transmission for the second PUSCH transmission, when receiving a physical DL control channel (PDCCH) indicating a HARQ ACK for the first PUSCH transmission. In one example, the UE may perform a new transmission for the second PUSCH transmission, when receiving a PDCCH indicating the new transmission for the second PUSCH transmission from the network.

In one example, the UE may perform a retransmission for the second PUSCH transmission, if the UE does not receive a HARQ feedback from the network after transmitting the first PUSCH transmission. In one example, the UE may release at least one radio resource for at least one PUSCH transmission of the plurality of PUSCH transmissions, if the UE does not receive a HARQ feedback from the network after transmitting the second PUSCH transmission. In one example, the UE may retransmit data in the second PUSCH transmission, if the UE is not able to transmit the first PUSCH transmission. In one example, the UE may not be able to transmit the first PUSCH transmission, if the channel is determined to be occupied (e.g., busy) according to the LBT result of the channel. In one example, the UE may repeat the first PUSCH transmission in the second PUSCH transmission, if there is no data for being transmitted in the second PUSCH transmission.

Figure 5:
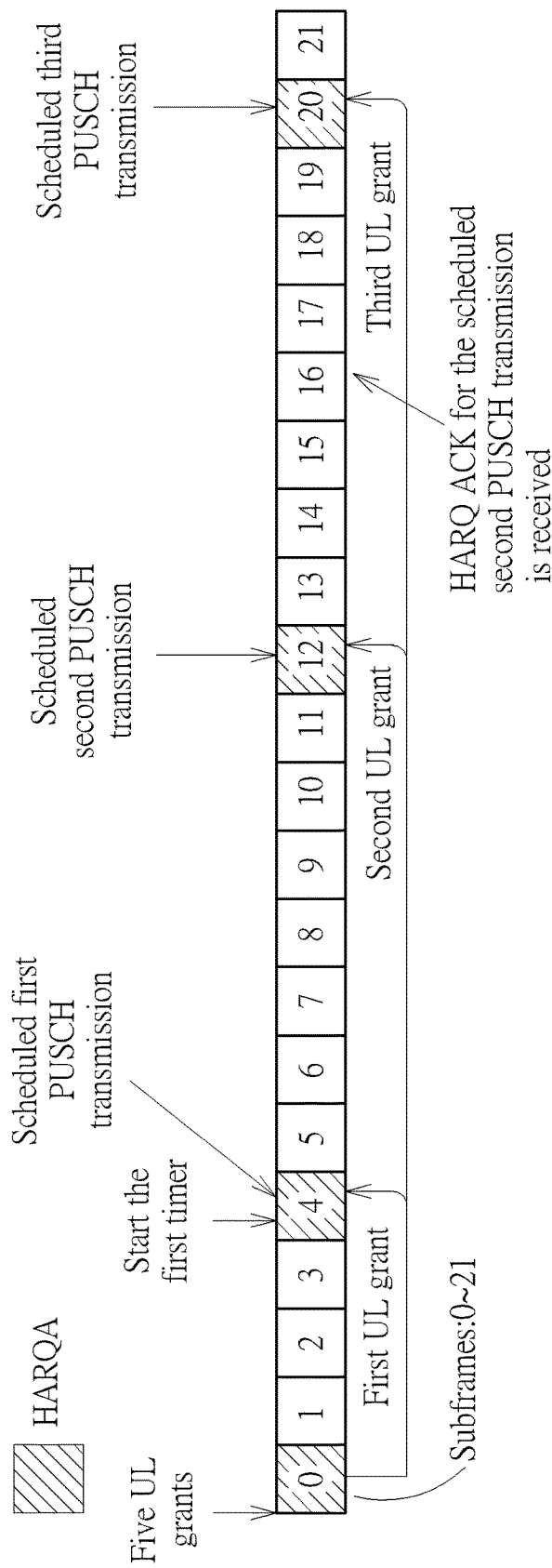
FIG. 5 is a schematic diagram of a HARQ process according to an example of the present invention.

FIG. 5 is a schematic of a HARQ process according to an example of the present invention. FIG. 5 may be applied to the processes 30 and 40. In FIG. 5, the UE may receive five UL grants from the network at a start of a subframe 0. Three UL grants of the UL grants may schedule three PUSCH transmissions associated with a HARQ process HARQA to the UE. A first UL grant of the three UL grants may schedule a first PUSCH transmission of the three PUSCH transmissions in a subframe 4. A second UL grant of the three UL grants may schedule a second PUSCH transmission of the three PUSCH transmissions in a subframe 12. A third UL grant of the three UL grants may schedule a third PUSCH transmission of the three PUSCH transmissions in a subframe 20. In other words, the first PUSCH transmission, the second PUSCH transmission, and the third PUSCH transmission may be scheduled by the network to be transmitted in the subframes 4, 12, and 20, respectively.

In FIG. 5, the UE may start a first timer in the subframe 4, if the UE is not able to perform the first PUSCH transmission, or if the UE is within a backoff period. The UE may not able to perform the first PUSCH transmission, if the UE determines a channel (e.g., frequency or band) to be occupied (e.g., busy) according to a LBT result of the channel. A value of the first timer may be set to be eight subframes. Thus, the UE start a second timer in the subframe 12, when the first timer expires. However, the second PUSCH transmission is scheduled to be transmitted in the subframe 12. In one example, the UE may start the first timer again and may stop (not start) the second timer, if the UE is not able to perform the second PUSCH transmission.

The UE may perform a new transmission for the third PUSCH transmission in the subframe 20, if the UE performs the second PUSCH transmission in the subframe 12 and receives a HARQ ACK for the second PUSCH transmission in a subframe 16. In one example, the UE may transmit an empty buffer status report (BSR) to the network and/or may release at least radio resource for the third PUSCH transmission, if there is no data for being performed a new transmission for the third PUSCH transmission after transmitting the second PUSCH transmission.

The UE may not perform the second PUSCH transmission in the subframe 12, if receiving a MAC control element or a PDCCH in the subframe 8 which indicates the UE to release at least radio resource for the second PUSCH transmission. In one example, the UE may not perform the second PUSCH transmission and the third PUSCH transmission, after receiving the MAC control element or the PDCCH in the subframe 8 which indicates the UE to release at least radio resource for the second PUSCH transmission and the third PUSCH transmission.

Those skilled in the art should readily make combinations, modifications and/or alterations on the abovementioned description and examples. The abovementioned description, steps and/or processes including suggested steps can be realized by means that could be hardware, software, firmware, an electronic system, or combination thereof. An example of the means may be the communication device 20.

To sum up, the present invention provides a device and a method for handling a HARQ process. In one example, the UE may receive (or monitor) the PDCCH (or ePDCCH) efficiently by utilizing (e.g., starting or restarting) the first timer and the second timer. In one example, the first PUSCH transmission and the second PUSCH transmission may be performed according to the first time offset and the second time offset, respectively. As a result, the problem of performing the communication operation in the unlicensed band is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a hybrid automatic repeat request (HARQ) process in a licensed assisted access (LAA) secondary cell (SCell), comprising:
    a storage unit, for storing instructions of:
    receiving at least one uplink (UL) grant from a network in a downlink (DL) subframe, wherein a UL grant of the at least one UL grant schedules at least one physical UL shared channel (PUSCH) transmission associated with a UL HARQ process in at least one UL subframe, and a first timer and a second timer are associated with the UL HARQ process;
    starting the first timer in a first UL subframe of the at least one UL subframe, if the communication device is not able to perform a PUSCH transmission of the at least one PUSCH transmission in the first UL subframe;
    starting the second timer, when the first timer expires; and
    monitoring a physical DL control channel (PDCCH), when the second timer is running; and
    a processing circuit, coupled to the storage unit, configured to execute the instructions stored in the storage unit.

2. The communication device of claim 1, wherein the communication device starts the first timer at a start of the first UL subframe.

3. The communication device of claim 1, wherein the communication device starts the first timer in the DL subframe.

4. The communication device of claim 1, wherein the communication device stops the second timer if the second timer is running, when the communication device starts the first timer.

5. The communication device of claim 1, wherein the communication device starts the first timer at an end of the first UL subframe.

6. The communication device of claim 1, wherein the communication device starts the first timer in a second UL subframe of the at least one UL subframe, and the PUSCH transmission is scheduled to be transmitted in the second UL subframe.

7. The communication device of claim 1, wherein an order of a plurality of PUSCH transmissions comprising the at least one PUSCH transmission is corresponded to an order of the at least one UL grant.

8. The communication device of claim 7, wherein a time distance between two consecutive PUSCH transmissions of the plurality of PUSCH transmissions is fixed, or is configured by the network via a radio resource control (RRC) message.

9. A method for handling a hybrid automatic repeat request (HARQ) process in a licensed assisted access (LAA) secondary cell (SCell) of a communication device, comprising:
    receiving at least one uplink (UL) grant from a network in a downlink (DL) subframe, wherein a UL grant of the at least one UL grant schedules at least one physical UL shared channel (PUSCH) transmission associated with a UL HARQ process in at least one UL subframe, and a first timer and a second timer are associated with the UL HARQ process;
    starting the first timer in a first UL subframe of the at least one UL subframe, if the communication device is not able to perform a PUSCH transmission of the at least one PUSCH transmission in the first UL subframe;
    starting the second timer, when the first timer expires; and
    monitoring a physical DL control channel (PDCCH), when the second timer is running.

10. The method of claim 9, wherein the communication device starts the first timer at a start of the first UL subframe.

11. The method of claim 9, wherein the communication device starts the first timer in the DL subframe.

12. The method of claim 9, wherein the communication device stops the second timer if the second timer is running, when the communication device starts the first timer.

13. The method of claim 9, wherein the communication device starts the first timer at an end of the first UL subframe.

14. The method of claim 9, wherein the communication device starts the first timer in a second UL subframe of the at least one UL subframe, and the PUSCH transmission is scheduled to be transmitted in the second UL subframe.

15. The method of claim 9, wherein an order of a plurality of PUSCH transmissions comprising the at least one PUSCH transmission is corresponded to an order of the at least one UL grant.

* * * * *